Figure 1:
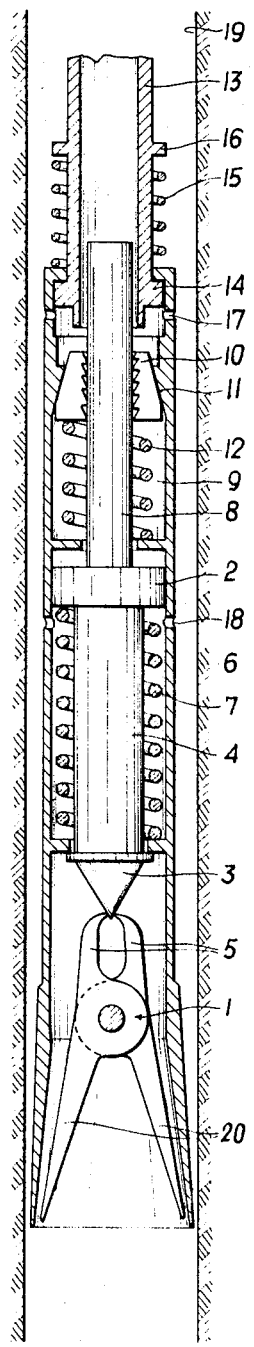

United States Patent

[11] 3,588,165

[72] Inventor Georg Varga, Vienna, Austria
[21] Appl. No. 807,010
[22] Filed Mar. 13, 1969
[45] Patented June 28, 1971
[73] Assignee Osterreichische Mineralolverwaltung Aktiengesellshaft, Vienna, Austria
[32] Priority Mar. 19, 1968
[33] Austria
[31] A2721/68

[54] FISHING DEVICE FOR DEEP WELLS
8 Claims, 3 Drawing Figs.
[52] U.S. Cl. .................... 294/86.3, 294/116, 294/88
[51] Int. Cl. .................... E21b 31/00, E21c 19/00
[50] Field of Search .................... 294/86.3, 86.14, 86.29, 86.31, 86.11, 116; 166/99

[56] References Cited
UNITED STATES PATENTS

| | | | |
|---|---|---|---|
| 1,719,584 | 7/1929 | Bonner | 294/86.29X |
| 1,795,322 | 3/1931 | Triplett | 294/86.3(X) |
| 2,709,617 | 5/1955 | Lang | 294/86.3(X) |
| 3,203,491 | 8/1965 | Turley | 166/99(X) |

Primary Examiner—Evon C. Blunk
Assistant Examiner—Douglas D. Watts
Attorney—Singer, Stern & Carlberg ABSTRACT: A fishing device for use in deep wells in which a fishing tool is arranged in the lower end of a tubular member and is adapted to be actuated by an axially movable piston in a cylinder connected to said tubular member when upon the fishing tool encountering a resistance in the well the piston is moved downwardly in the cylinder by the pressure of the drilling fluid supplied by a pipe length connected to the upper end of the cylinder after a piston slide value in the upper end of the cylinder has been closed to prevent the drilling fluid from being discharged into the drill hole. The fishing tool when actuated seizes the article to be removed from the well and a piston rod on the piston is locked in place so that the fishing tool may be raised to remove the seized article from the well.

PATENTED JUN28 1971

3,588,165

INVENTOR
Georg Varga
BY Singer, Stern & Carlberg
ATTORNEYS

FISHING DEVICE FOR DEEP WELLS

This invention relates to a fishing device for picking up parts in drillings, especially deep wells.

In handling work on hoist sounding devices or on drilling sounding devices it frequently occurs that articles, for example screws, pipe length cotters, roller bits, connection sockets, chains, ventilation valves, cables, parts of packings, etc., fall into the drill hole. These articles must be hauled out of the drill hole again and the work necessary for this purpose is very time consuming and toilsome. For picking up such articles, known as "fish" in the drilling, numerous fishing devices are already known. All these known fishing devices, such as fishing taps, bell-mounted fishing sockets, casing spears, "overshots," fishing hooks, etc. possess the disadvantage that they are not universally usable, but that for example with fishing taps it is possible to fish only articles having a bore, that is for example pipes or the like. Furthermore, when using the known devices the personnel situated above the ground cannot recognize whether the article to be fished is in fact connected with the fishing tool or not. The weight of the pipe length for lowering the fishing tool and of the fishing tool itself can amount, according to the depth of the drill hole, to about 15 to 30 tons and therefore an increase of weight by the weight of the article to be fished, amounting as a rule to only a few kilogrammes, cannot be ascertained. Thus, with the known fishing devices after every fishing operation the result can be ascertained only optically, that is to say in order to be able to ascertain whether the article to be fished is hanging on the fishing tool, the entire pipe length must be dismantled. It is obvious that the fishing of articles situated in the drill hole by means of the known fishing devices takes very much time and that since success occurs frequently only after a large number of attempts, days of work are frequently necessary.

Furthermore, a fishing device for the fishing of foreign bodies in a drill hole is known in which a bellmouthed fishing socket is connected with a piston which possesses a bore with a ball-valve seating. During the lowering of the fishing device, flushing takes place through this bore by means of a drill hole liquid supplied through the pipe length on which the fishing tool is suspended. After the lowering of the fishing device to the desired depth a steel ball is introduced from below ground into the pipe length, which ball drops on to the ball valve seating and thus effects a closure of the bore in the piston. Thus, in the working chamber of the piston a pressure rise takes place by which the piston and thus also the fishing socket connected with this piston are moved downwards for the fishing of the article. In this known device furthermore in the cylinder wall an opening connecting the working chamber with the drill hole is provided, which is closed by a valve flap which opens after the downward movement of the piston, so that after the fishing operation the circulation of the drill hole liquid is maintained again. This known fishing device likewise possesses the disadvantage that an aboveground indication as to whether the article to be fished is situated in the fishing socket does not take place, and with this known fishing device, opening of the fishing socket also cannot be effected when the pipe length is installed. Thus, here again the entire pipe length must be dismantled in order to be able to ascertain the result of the fishing operation and if necessary to open the fishing socket for a renewed fishing operation.

The present invention seeks to avoid the above stated disadvantages and to provide a fishing device for picking up parts in drillings, especially deep wells, in which the fishing tool is actuated in a simple manner and which permits an indication of the result directly after the fishing operation.

The invention is based upon a fishing device having a fishing tool actuatable from above ground, which is secured on the lower end of a pipe length introducible into the drill hole and fed with a drill hole liquid, and the fishing movement of which is effected by means of a piston the working chamber of which is connected with the pipe length, while in the cylinder wall at least one closable opening is provided connecting the working chamber with the drill hole, and the invention consists essentially in that the pipe length is coupled with the fishing tool for displacement in the axial direction between two positions and comprises a closure member which in the upper position clears the opening in the cylinder wall and in the lower position closes it. In such a form of embodiment, when the fishing tool on introduction into the drill hole strikes against a resistance, which can be formed by the floor of the drill hole or by the article itself to be fished, the closure element is automatically shifted by the weight of the pipe length into its lower position closing the opening in the cylinder wall, so that without any controlling action from above ground the fishing operation is initiated on the reaching of an obstacle. Thus, a pressure rise takes place in the working chamber of the piston, which effects a displacement of the piston and thus of the fishing tool.

The arrangement is expediently made such that the pipe length extends into the working chamber of the piston and on its end a piston slider displaceable in the working chamber between two end positions is provided as closure member. In this way a seal of the pipe length end in relation to the working chamber of the piston is achieved and at the same time escape of drill hole liquid at the coupling point is avoided. The closure member is expediently held by a spring in the upper position clearing the opening in the working chamber, which spring is displaceable by the weight of the pipe length. This spring ensures that on lowering, as long as the weight of the pipe length does not rest on the fishing tool held fast by an obstacle, the closure member is always held in its upper position so that undesired initiation of the fishing operation is avoided.

During the dismantlement of the pipe length after the fishing operation is completed it is not possible as a rule to maintain the pressure in the pipe length necessary for clamping the article fast by means of the fishing tool. In order to ensure firm retention of the article in the fishing tool even at reduced pressure, according to the invention the position of the piston can be made fast preferably by wedges acting upon the piston rod. These wedges expediently cooperate with an inclined countersurface arranged on the cylinder inner wall and are pressed into the blocking position by a spring. In this case the wedges can comprise downwardly directed teeth on their engagement surface cooperating with the piston rod, so that when this toothed surface is applied to the piston rod a downward movement of the piston rod is rendered possible, but not an upward movement thereof. If the wedges are loaded for example by the weight of the lowered pipe length against the force of the spring acting upon them, then the blocking between the wedges and the piston rod is disengaged so that the piston can return into its initial position. Therefore with this form of embodiment it is possible to disengage the arresting of the piston by means of the wedges even underground and to commence a new fishing attempt without the necessity of removing the fishing device from the drill hole for this purpose.

According to a preferred form of embodiment of the invention at least one additional opening is provided in the cylinder wall, which effects a connection of the working chamber with the drill hole only in the lower end position of the piston. If in a fishing attempt the article to be fished is not picked up by the fishing tool, then the fishing tool closes so far that the piston assumes this lower end position. Due to the fact that now in this end position of the piston the working chamber is connected with the drill hole through the additional opening, a pressure relief of the working chamber takes place, the piston, which is expediently pressed into its upper end position by a spring, is returned into this upper end position and thus automatically brought into its initial position for the next fishing attempt, and furthermore a pressure drop takes place in the working chamber and thus also in the pipe length, which can be indicated above ground. From the indication of this pressure drop it can be seen that the fishing attempt was unsuccessful and a further fishing attempt can be commenced immediately without time delay.

Figure 2:
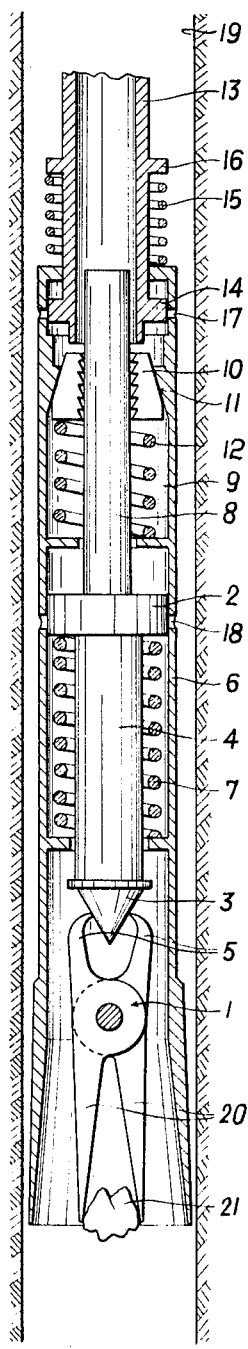
Figure 3:
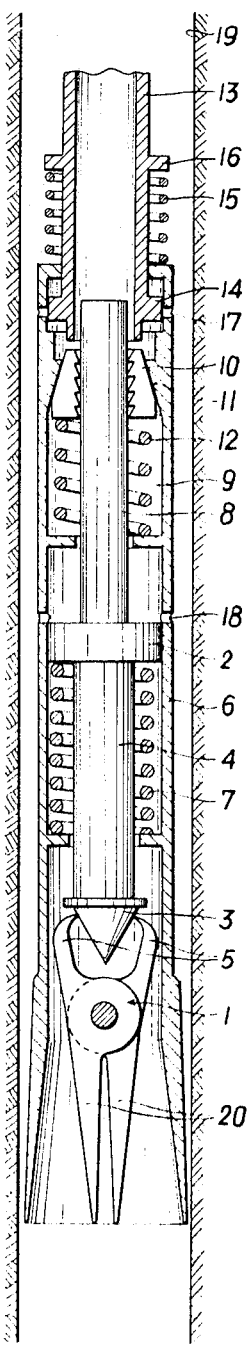

The invention is defined in the claims hereinafter and how it may be performed is further explained below with reference to the accompanying drawing, in which the invention is illustrated diagrammatically by reference to an example of embodiment. A fishing device according to the invention is illustrated in longitudinal section in FIGS. 1 to 3, wherein:

FIG. 1 represents the position of the individual parts during driving into the drill hole, FIG. 2 represents the position of these parts in the case of a successful fishing attempt and FIG. 3 represents the position of these parts in the case of an unsuccessful fishing attempt.

As shown in the drawing, the fishing device according to the invention consists of a fishing tool 1 which in the example of embodiment as illustrated is formed as tongs. However, any desired other fishing tool can be used of course. The closing movement of the tongs 1 is caused by a piston 2 which is connected with a piston stem 4 having a cone 3 at its end. The cone 3 on downward movement of the piston 2 pushes itself between the two arms 5 of the tongs 1 and thus effects the closing movement thereof. The piston 2 is arranged in a cylinder 6 and is pressed by a spring 7 into its upper end position. At the end of the piston 2 opposite to the piston stem 4 the piston is connected with a piston rod 8 which extends into the working chamber 9 of the cylinder 6. This piston rod 8 can be arrested by wedges 10 which can be shifted along countersurfaces 11 arranged on the inner side of the cylinder wall end are loaded by a spring 12. The connection of the fishing device with the pipe length 13 takes place through a piston slide valve 14 which is connected with the end of the pipe length 13 protruding into the working chamber 9 and is arranged for displacement between two positions in this working chamber. By means of a spring 15 bearing on the one hand on the cylinder 6 and on the other on an extension 16 of the pipe length 13, the piston slide valve 14 is held in its upper position in which openings 17 in the cylinder wall are cleared so that the drill hole liquid circulating in the pipe length 13 can escape through these openings 17 into the drill hole. Furthermore, additional openings 18 are provided in the cylinder wall, over which the piston slides when in the lower end position as illustrated in FIG. 3, so that when the piston 2 is in this end position there is again a connection of the working chamber 9 with the drill hole through the openings 18.

When the fishing device according to the invention is lowered into the drill hole, the individual parts of this fishing device are in the position as represented in FIG. 1. In this position the drill hole liquid delivered through the pipe length 13 can escape through the openings 17 into the drill hole, so that a circulation of the drill hole liquid is effected, by means of a pump assembly situated above ground, through the pipe length 13, the openings 17 and the annular space remaining free between pipe length and casing 19 back upwards in known manner. Thus, a pressure equilibration takes place between the interior of the pipe length 13 or the working chamber 9 and the pressure prevailing in the drill hole.

If now on lowering of the fishing device the fishing tool 1 encounters a resistance, whether on the floor of the drill hole or whether on the article to be fished which is jammed in the drill hole, then the weight of the pipe length 13 bears upon the fishing tool 1, the pipe length 13 and with it the piston slide valve 14 are lowered against the force of the spring 15 and close off the openings 17. Thus, a pressure rise occurs in the pipe length 13 and in the working chamber 9, which can be seen on a manometer situated above ground. With rising pressure the piston 2 is pushed downwards, overcoming the force of the spring 7, and thus by means of the cone 3 it closes the tongs 1. If now an article 21 to be fished is clamped in between the two jaws 20 of the tongs, as represented in FIG. 2, the piston pressure rises further namely up to a specific, preselected maximum pressure which corresponds to a desired clamping force of the tongs 1. The pressure rise legible on the manometer above ground ensures that the article to be fished is situated between the jaws 20 of the tongs 1. The openings 17 are cleared again by brief lifting of the pipe length 13, so that a circulation of the drill hole liquid takes place again. In order now to prevent displacement of the piston 2 by the spring 7 into its upper end position and thus opening of the tongs jaws 20, the piston rod 8 is arrested by means of the wedges 10, the firm clamping being supported by the spring 12. In order further to improve the self-locking wedge effect of the wedges 10, these are provided with downwardly directed saw-type toothing which reliably prevents upward movement of the piston rod 8. Now the pipe length 13 together with the fishing tool and the fished article 21 can be removed, whereby the fishing operation is terminated.

If however in the above-described fishing operation the article to be fished was not clamped in between the tongs jaws 20, these tongs jaws 20 are pushed further towards one another by the hydraulic pressure in the working chamber 9. Thus, the piston 2 comes into the position as represented in FIG. 3 in which the additional openings 18 in the cylinder wall are cleared. Thus, circulation of the drill hole liquid again takes place between the pipe length 13 and the annular space between the drill hole wall and the fishing device, and a sudden pressure drop can be ascertained on the manometer arranged above ground. From this indication of the manometer it can be seen that the tongs jaws 20 have merely carried out an idle movement and that the article to be fished was not picked up by these tongs jaws, that is to say the fishing operations was unsuccessful. Now by the placing of the fishing tool 1 upon the floor of the drill hole or upon the jammed article to be fished, the pipe length 13 can be displaced so far downwards by its weight against the force of the spring 15 that the weight acts upon the wedges 10 and displaces these downwards along the countersurface against the force of the spring 12, so that the mechanical locking of the piston 2 is eliminated. The piston 2 is now displaced into its upper initial position by the spring 7 and at the same time the tongs jaws 20 are opened, so that the fishing operation can be repeated without it being necessary to remove the fishing device previously from the drill hole. Before the commencement of a renewed fishing operation it is expedient to change the fishing position of the fishing tool by rotation of the pipe length 13.

I claim:

1. A fishing device for picking up parts in drillings, especially deep wells, with a fishing tool actuatable from above ground and secured on the lower end of a pipe length introducible into the drill hole and fed with a drill hole liquid, the fishing movement of which tool is effected by means of a piston the working chamber of which is in communication with the pipe length, while in the cylinder wall there is provided at least one closable opening connecting the working chamber with the drill hole, characterized in that the pipe length is coupled with the fishing tool for displacement in the axial direction between two positions and comprises a closure member which in the upper position clears the opening in the cylinder wall and in the lower position closes this opening.

2. A fishing device according to claim 1, characterized in that the pipe length extends into the working chamber of the piston and in that a piston slide valve displaceable in the working chamber between two end positions is provided on its end as closure member.

3. A fishing device according to claim 1, characterized in that the closure member is held by a spring in the upper position clearing the opening in the working chamber, which spring is displaceable by the weight of the pipe length.

4. A fishing device according to claim 1 characterized in that the position of the piston can be made fast preferably by wedges acting upon the piston rod.

5. A fishing device according to claim 4 characterized in that the wedges cooperate with an inclined countersurface arranged on the inner wall of the cylinder and are pressed into the blocking position by a spring.

6. A fishing device according to claim 4, characterized in that the wedges have downwardly directed teeth on their engaging surface which cooperates with the piston rod.

7. A fishing device according to claim 1, characterized in that in the cylinder wall at least one additional opening is provided which effects a connection of the working chamber with the drill hole only when the piston is in the lower end position.

8. A fishing device according to claim 1, characterized in that the piston is pressed into its upper end position by a spring.